United States Patent

Muntnich et al.

[11] Patent Number: 6,116,787
[45] Date of Patent: *Sep. 12, 2000

[54] THRUST ROLLING BEARING

[75] Inventors: Leo Muntnich, Aurachtal; Wolfgang Steinberger, Herzogenaurach, both of Germany

[73] Assignee: INA Walzlager Schaeffler KG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/011,962

[22] PCT Filed: Jul. 13, 1996

[86] PCT No.: PCT/EP96/03082

§ 371 Date: Feb. 17, 1998

§ 102(e) Date: Feb. 17, 1998

[87] PCT Pub. No.: WO97/11284

PCT Pub. Date: Mar. 27, 1997

[30] Foreign Application Priority Data

Sep. 21, 1995 [DE] Germany .............. 195 35 085

[51] Int. Cl.[7] .................................................. F16C 19/30
[52] U.S. Cl. ............................................................ 384/621
[58] Field of Search ................................. 384/621, 622, 384/623, 908, 909

[56] References Cited

U.S. PATENT DOCUMENTS 3,981,549  9/1976  Carullo .................................. 384/622

FOREIGN PATENT DOCUMENTS

| 1223324 | 6/1960 | France . |
|---|---|---|
| 1446492 | 10/1966 | France . |
| 2176330 | 10/1973 | France . |
| 2528922 | 12/1983 | France . |
| 2665494 | 2/1992 | France . |
| 1079901 | 4/1960 | Germany . |
| 3134625 | 4/1983 | Germany . |
| 3912856 | 11/1989 | Germany . |
| 3931709 | 3/1990 | Germany . |
| 4142313 | 6/1993 | Germany . |
| 4416320 | 1/1995 | Germany . |
| 826091 | 12/1959 | United Kingdom . |
| 1187290 | 4/1970 | United Kingdom . |

OTHER PUBLICATIONS

JP 2–51615, Patent Abstracts of Japan, M–970, May 1990, vol. 14, No. 217.

*Primary Examiner*—Lenard A. Footland
*Attorney, Agent, or Firm*—Bierman, Muserlian and Lucas

[57] ABSTRACT

Two race washers (3 and 4) of a thrust rolling bearing comprise on a peripheral edge two collars (5 and 6) directed towards each other so that an annular gap (7) is formed. The rim (8) of the cage (2) is guided in this annular gap (7).

3 Claims, 2 Drawing Sheets

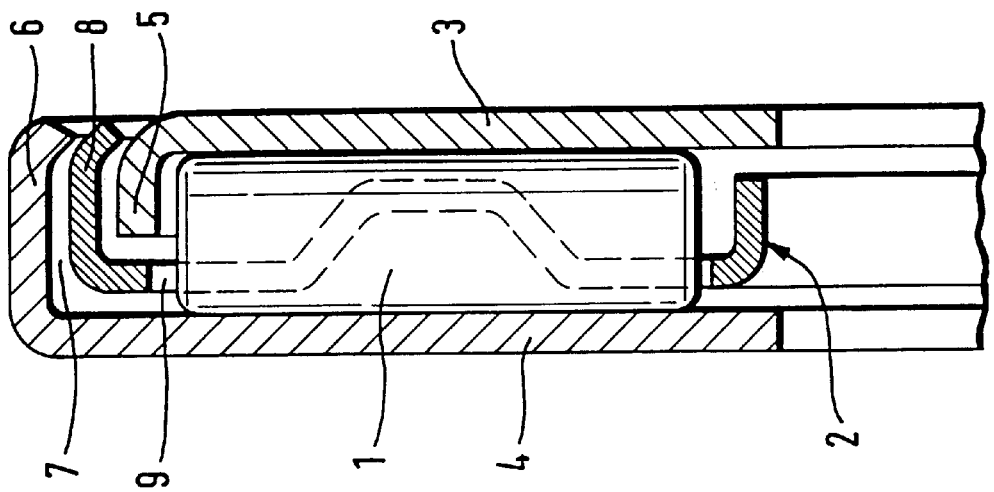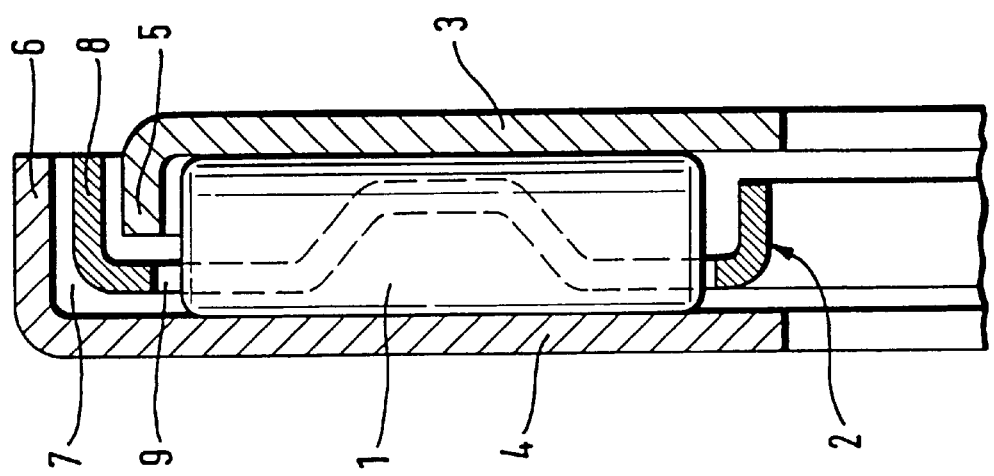

THRUST ROLLING BEARING

FIELD OF THE INVENTION

The invention concerns a thrust rolling bearing comprising a cage containing cylindrical rollers or needles arranged in pockets, said cage being arranged between two parallel-faced thin-walled race washers made particularly of sheet metal, at least one of the race washers merging into an axially directed collar at one peripheral edge.

BACKGROUND OF THE INVENTION

A thrust rolling bearing of the pre-cited type is known from U.S. Pat. No. 2,891,828. The drawback of this bearing consists in that the cage can come into contact with the race washers during operation. This can occur particularly when such thrust rolling bearings are used in converters of automobile transmissions. In certain operating states, the so-called shaft-locating washer lifts off from the rolling elements in axial direction with the result that the rolling element crown ring guided in a cage is unloaded and falls radially inwards to come into contact either with the shaft or the collar of the shaft-locating washer. If under these circumstances, the so-called housing-locating washer is not centered in the housing, it too falls axially inwards and comes to be supported on the cage.

When the shaft-locating washer comes anew into contact with the rolling elements, the cage is clamped-in and this leads on the one hand to malfunctioning and on the other hand, to an undesired high noise generation.

These drawbacks are encountered particularly whenever, with the aim of enhancing the bearing capacity of thrust cages, one endeavours to give the cage a structural configuration that permits the largest possible number of rolling elements to be lodged therein. Due to the large number of rolling elements fitted in the cage, the crossbars in the innermost region of the cage have only a very small material cross-section, i.e. the cage has a filigree structure. It is quite obvious that such a filigree cage is subject to a great danger of fracture when force transmission within the thrust rolling bearing takes place through this cage.

SUMMARY OF THE INVENTION

The object of the invention is to avoid the aforesaid drawbacks and to configure the cage in a simple manner such that a clamping-in and eventual destruction of the cage is prevented.

The invention achieves this object by the fact that the collars of the race washers arranged on one peripheral end and directed towards each other are matched to each other so as to form a continuous annular gap in which a rim of the cage is guided.

By this measure, it is obtained that upon a rotation of the thrust bearing, the cage can rotate freely between the race washers and, upon a lift-off or re-approach of one of the washers, the forces occurring in the bearing are not transmitted through the entire cage but only between the rim of the cage and the two axially directed collars of the race washers. This not only reduces wear but also considerably increases the operating life period of such a bearing having a filigree cage.

In a further development of the invention, the race washers and the cage form an assembled unit by positive inter-engagement. Such a pre-assembled component considerably facilitates mounting. According to another feature of the invention the rim of the cage and/or the axially directed collars of race washers are provided with an antifriction coating. This results in a further reduction of friction within the thrust rolling bearing.

The invention will now be described more closely with the help of the following example of embodiment.

BRIEF DESCRIPTION OF THE DRAWINGS

FIGS. 1, 2 and 3 are longitudinal cross-sections through a thrust rolling bearing, the rim of the cage being guided between two axially directed collars,

DETAILED DESCRIPTION OF THE DRAWINGS

Figure 3:
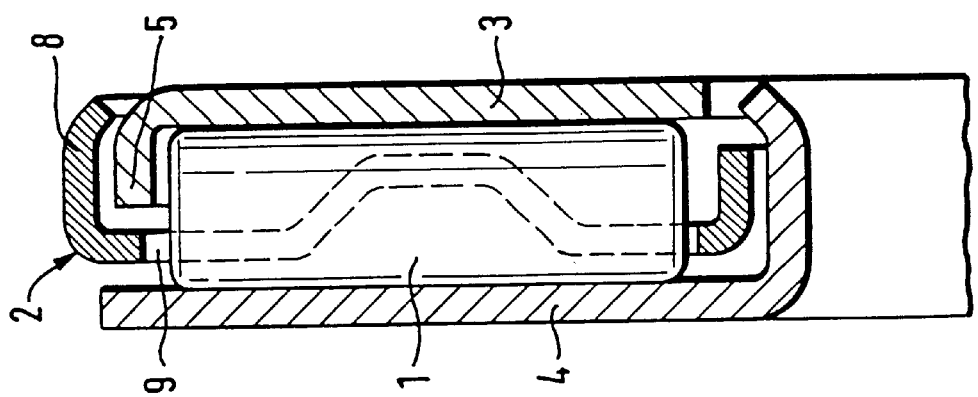

The thrust rolling bearing represented in FIGS. 1 and 2 comprises a cage 2 containing rolling elements 1, the cage 2 being arranged between two parallel-faced, thin-walled race washers 3 and 4 made particularly of sheet metal, the three components 2, 3 and 4 of FIG. 2 forming an assembled unit by positive inter-engagement. The race washer 3 comprises on its outer perpheral edge, an axially directed collar 5 and the race washer 4 comprises, likewise on its outer peripheral edge, a collar 6, the collars 5 and 6 being matched to each other in radial direction so as to form a continuous annular gap 7 in which a rim 8 of the cage 2 is guided between the two collars 5 and 6.

On the supposition that the right-hand washer 3 is firmly anchored in a housing, the washer 4 will, at first, when a shaft, not shown, lifts-off from the washer 4, fall on the axially directed rim 8 of the cage 2 which, in turn, will then come to be supported on the axially directed collar 5 of the race washer 3. This configuration of the thrust rolling bearing of the invention assures that the forces occurring in the bearing due to a re-seating of the shaft on the washer 4 are transmitted only between the collar 6 of the race washer 4, the rim 8 of the cage 2 and the collar 5 of the race washer 3. Advantageously, such a thrust rolling bearing can be mounted unaligned, i.e. both the race washer 3 and the race washer 4 can be centered.

The thrust rolling bearing represented in FIG. 3 comprises a cage 2 with a double-bent rim 8 having the form of an open U in axial direction. This double-bent rim 8 endows the cage 2 with a high degree of stability.

What is claimed is:

1. A thrust rolling bearing comprising a cage (2) containing cylindrical rollers or needles (1) arranged in pockets (9), said cage (2) being arranged between two parallel-faced thin-walled race washers (3,4) made of sheet metal, each of the race washers (3,4) merging into an axially directed collar (5,6) at one peripheral edge, characterized in that the collars (5,6) of the race washers (3,4) arranged on one peripheral end and directed towards each other are matched to each other so that a continuous annular gap (7) is formed radially between the collars (5,6) and an axially lengthened rim (8) of the cage (2) is guided in said annular gap (7).

2. A thrust rolling bearing of claim 1 wherein the race washers (3, 4) and the cage (2) form an assembled unit by positive inter-engagement.

3. A thrust rolling bearing of claim 1 wherein the rim (8) of the cage (2) and/or the axially directed collars (5,6) of the race washers (3,4) are provided with an anti-friction coating.

* * * * *